(12) United States Patent
Kummer (10) Patent No.: US 11,428,037 B2
(45) Date of Patent: Aug. 30, 2022

(54) SPINDLE DRIVE ASSEMBLY, VEHICLE HATCH WITH A SPINDLE DRIVE ASSEMBLY AND METHOD FOR INSTALLING AN EPICYCLIC GEARING OF A SPINDLE DRIVE ASSEMBLY

(71) Applicant: U-SHIN DEUTSCHLAND ZUGANGSSYSTEME GMBH, Erdweg (DE)

(72) Inventor: Frank Kummer, Erdweg (DE)

(73) Assignee: U-SHIN DEUTSCHLAND ZUGANGSSYSTEME GMBH, Erdweg (DE)

( * ) Notice: Subject to any disclaimer, the term of this patent is extended or adjusted under 35 U.S.C. 154(b) by 216 days.

(21) Appl. No.: 16/764,681

(22) PCT Filed: Nov. 20, 2018

(86) PCT No.: PCT/EP2018/081960
§ 371 (c)(1),
(2) Date: May 15, 2020

(87) PCT Pub. No.: WO2019/105806
PCT Pub. Date: Jun. 6, 2019

(65) Prior Publication Data
US 2020/0408024 A1 Dec. 31, 2020

(30) Foreign Application Priority Data
Nov. 30, 2017 (DE) ...................... 10 2017 128 388.9

(51) Int. Cl.
*F16H 25/20* (2006.01)
*E05F 15/622* (2015.01)
(Continued)

(52) U.S. Cl.
CPC ............. *E05F 15/622* (2015.01); *B60J 5/106* (2013.01); *F16H 1/28* (2013.01); *F16H 25/20* (2013.01);
(Continued)

(58) Field of Classification Search
CPC ........... E05F 15/622; B60J 5/106; F16H 1/28; F16H 25/20; F16H 57/023;
(Continued)

(56) References Cited

U.S. PATENT DOCUMENTS 6,516,567 B1 * 2/2003 Stone .................... E05F 15/622
49/343
9,657,516 B2 * 5/2017 Graybar ................ F16H 57/082
(Continued)

FOREIGN PATENT DOCUMENTS

CN 107317428 A 11/2017
DE 102017122189 A1 10/2018
(Continued)

*Primary Examiner* — Justin Holmes
(74) *Attorney, Agent, or Firm* — Dilworth IP, LLC (57) ABSTRACT

A spindle drive assembly for opening and/or closing a vehicle hatch is described. This comprises a spindle extending along a spindle drive axis and a spindle drive motor coupled to the spindle in terms of drive, the motor shaft of which is arranged substantially coaxially with respect to the spindle drive axis. The spindle drive motor is coupled to the spindle via a two-stage epicyclic gearing. Furthermore, a vehicle hatch with such a spindle drive assembly is presented. A method for installing an epicyclic gearing of such a spindle drive assembly is additionally specified.

14 Claims, 11 Drawing Sheets

(51) Int. Cl.
*B60J 5/10* (2006.01)
*F16H 1/28* (2006.01)
*F16H 57/023* (2012.01)
*F16H 57/00* (2012.01)

(52) U.S. Cl.
CPC ...... *F16H 57/023* (2013.01); *E05Y 2201/434* (2013.01); *E05Y 2201/70* (2013.01); *E05Y 2201/702* (2013.01); *E05Y 2201/72* (2013.01); *E05Y 2900/546* (2013.01); *F16H 2001/2872* (2013.01); *F16H 2025/2031* (2013.01); *F16H 2025/2075* (2013.01); *F16H 2025/2087* (2013.01); *F16H 2057/0056* (2013.01)

(58) Field of Classification Search
CPC ..... F16H 2001/2872; F16H 2025/2031; F16H 2025/2075; F16H 2025/2087; F16H 2057/0056; E05Y 2201/434; E05Y 2201/70; E05Y 2201/702; E05Y 2201/72; E05Y 2900/546; E05Y 2201/696; E05Y 2800/205; E05Y 2800/232; E05Y 2800/422
See application file for complete search history.

(56) References Cited

U.S. PATENT DOCUMENTS

| | | | |
|---|---|---|---|
| 10,738,526 B2 * | 8/2020 | Ishikawa | ............... E05F 15/622 |
| 2016/0144694 A1 | 5/2016 | Shchokin et al. | |
| 2018/0216391 A1 | 8/2018 | Takizawa et al. | |
| 2018/0283076 A1 | 10/2018 | Gorosin et al. | |

FOREIGN PATENT DOCUMENTS

| | | | | |
|---|---|---|---|---|
| EP | 1347212 A1 * | 9/2003 | ............... | F16H 1/46 |
| WO | 2017022581 A1 | 2/2017 | | |

* cited by examiner

SPINDLE DRIVE ASSEMBLY, VEHICLE HATCH WITH A SPINDLE DRIVE ASSEMBLY AND METHOD FOR INSTALLING AN EPICYCLIC GEARING OF A SPINDLE DRIVE ASSEMBLY

The invention relates to a spindle drive assembly for opening and/or closing a vehicle hatch.

The invention furthermore relates to a vehicle hatch, in particular a vehicle tailgate or a vehicle boot lid, with such a spindle drive assembly.

The invention additionally relates to a method for installing an epicyclic gearing of such a spindle drive assembly.

BACKGROUND OF THE INVENTION

Vehicle hatches and spindle drive assemblies of the type named at the beginning are known from the state of the art.

The known spindle drive assemblies as a rule comprise an electric spindle drive by means of which the assigned vehicle hatch can be opened and/or closed. A user of an associated vehicle thus no longer needs to carry out the opening and/or closing manually. It is merely necessary to send an opening or closing instruction to the spindle drive assembly, which can be done for example via a radio remote control or via a switch arranged in the vehicle. A foot switch, which can be operated contactlessly, arranged on the vehicle exterior, can also be used.

In order to achieve the desired speed of movement of the vehicle hatch during the opening and closing, the rotational speed of a spindle drive motor must be reduced, for which a reduction gearing is used in known spindle drive assemblies.

The object of the invention is to specify a spindle drive assembly with a particularly compact reduction gearing. Moreover, the reduction gearing is to have a high efficiency.

SUMMARY OF THE INVENTION

The object is achieved by a spindle drive assembly of the type named at the beginning, with a spindle extending along a spindle drive axis and a spindle drive motor coupled to the spindle in terms of drive, the motor shaft of which is arranged substantially coaxially with respect to the spindle drive axis, wherein the spindle drive motor is coupled to the spindle via a two-stage epicyclic gearing. In a preferred embodiment, the spindle drive motor is an electric motor. The transmission ratio necessary to move the vehicle hatch can be provided by the two-stage epicyclic gearing. At the same time, such a gearing is particularly compact along the spindle drive axis. It thus has an axially short construction. In addition, epicyclic gearings have a comparatively high efficiency.

The two stages of the two-stage epicyclic gearing can be called spindle-side epicyclic gearing stage and motor-side epicyclic gearing stage.

Preferably, the two-stage epicyclic gearing is a reduction gearing with a transmission ratio of from 10:1 to 20:1, in particular of from 15:1 to 18:1.

The two-stage epicyclic gearing advantageously comprises a single planet carrier. The planet carrier is thus the planet carrier for a spindle-side epicyclic gearing stage and a motor-side epicyclic gearing stage. It can be produced in one piece. The structure of the two-stage epicyclic gearing is thereby relatively simple. The result is that the epicyclic gearing can be produced and installed with little effort. In comparison with two-stage epicyclic gearings with two separate planet carriers, an epicyclic gearing with a single planet carrier can in addition be constructed shorter axially.

The planet carrier is preferably produced from plastic, in particular from a polyamide, for example nylon, which is also called PA 66. Reinforcing fibres, in particular glass fibres, can be added to the plastic.

In an embodiment, a first epicyclic gearing stage and a second epicyclic gearing stage comprise the same number of planet gears, wherein in each case one planet gear of the first epicyclic gearing stage and one planet gear of the second epicyclic gearing stage are mounted on a common planet gear axle. Planet gears coupled in this way are also called double-stage planet gears. Each epicyclic gearing stage preferably comprises three or four planet gears. In comparison with separate, i.e. single-stage planet gears, the structure of the two-stage epicyclic gearing is therefore more simple. In particular, fewer individual parts are required. Such an epicyclic gearing can thereby be produced and installed particularly efficiently.

The planet gears are preferably produced from polyoxymethylene (POM).

The planet gears mounted on a common planet gear axle can be connected to each other in a rotationally fixed manner. For this purpose the planet gears of a common planet gear axle can first be produced separately and then connected. However, the planet gears mounted on a common planet gear axle are preferably produced in one piece. An installation or connection step can thus be omitted.

Two-stage epicyclic gearings in which the planet gears of the two stages are mounted in pairs on common planet gear axles and the planet gears mounted on a common planet gear axle are connected to each other in a rotationally fixed manner, are also called Wolfrom gearings. The two-stage epicyclic gearing according to the invention is thus a Wolfrom gearing.

The epicyclic gearing is preferably spiral-toothed, wherein both epicyclic gearing stages are spiral-toothed in the same direction. Spiral tooth systems can be realized in a simple manner in particular with production methods used in plastics technology. Usually a spiral tooth system involves axial forces resulting from the meshing of the teeth. In the present two-stage epicyclic gearing, however, the axial forces resulting from the two spiral tooth systems of the two epicyclic gearing stages substantially cancel each other out. Considered as a whole, the epicyclic gearing according to the invention is thus free of axial forces. Corresponding elements for supporting the forces can consequently be dispensed with, whereby the structure of the epicyclic gearing becomes particularly simple.

In a variant, the motor shaft is rotationally coupled to a sun gear of a motor-side epicyclic gearing stage, in particular wherein the motor shaft is rotationally coupled to the sun gear via a coupling. The sun gear can be pressed onto a steel shaft. The coupling is preferably an Oldham coupling and serves to compensate for an axial offset that is possibly present. The components of the coupling can also be pressed onto the steel shaft. The drive torque of the spindle drive motor is thus coupled into the two-stage epicyclic gearing reliably and with high efficiency.

A ring gear of a motor-side epicyclic gearing stage can also be mounted in a spindle drive assembly housing and/or in an epicyclic gearing housing in a rotationally fixed and axially fixed manner. In particular, the ring gear of the motor-side epicyclic gearing stage is laser welded to the spindle drive assembly housing or the epicyclic gearing housing. Alternatively, it can be produced in one piece with a component of the epicyclic gearing housing. In a further alternative, the ring gear can be connected to the spindle drive assembly housing or the epicyclic gearing housing via a press fit. Thus, a comparatively simple structure of the epicyclic gearing results.

For the case where the ring gear is laser welded to the spindle drive assembly housing or the epicyclic gearing housing and the welding is effected in a lap joint, the join partner lying outside is designed to be transparent to laser light. A reliable welding of the two join partners is thus achieved.

In a design alternative, it is provided that a spindle-side epicyclic gearing stage is designed without a sun gear, wherein all planet gears of the spindle-side epicyclic gearing stage are mounted radially on an axial mounting extension of the sun gear shaft of the motor-side epicyclic gearing stage. The axial mounting extension thus replaces the sun gear. It has no tooth system. The structure of the epicyclic gearing is thereby particularly simple.

In addition, a ring gear of the spindle-side epicyclic gearing stage can be rotationally coupled to the spindle, in particular rotationally coupled via a coupling. The ring gear of the spindle-side epicyclic gearing stage therefore represents the output of the epicyclic gearing. The coupling is preferably a torsionally flexible coupling, for example a torsionally flexible claw coupling. Here the spindle-side coupling element can be connected to the spindle in a rotationally fixed manner via a serration. The torque coming from the epicyclic gearing is thus reliably coupled into the spindle. This takes place with high efficiency.

A ring gear of the spindle-side epicyclic gearing stage is preferably rotatably mounted in a spindle drive assembly housing and/or in an epicyclic gearing housing. Thus the spindle is also rotatably mounted in the spindle drive assembly housing and/or in the epicyclic gearing housing.

Furthermore, the object is achieved by a vehicle hatch of the type named at the beginning with a spindle drive assembly according to the invention. Such a vehicle hatch can be opened and/or closed with high efficiency. In addition, the spindle drive assembly occupies only a comparatively small installation space. In other words, the spindle drive assembly only limits the installation space for the remaining components of the vehicle hatch to a particularly small extent.

In addition to the above-named vehicle hatches, luggage or loading hatches in recreation or commercial vehicles can also be equipped with a spindle drive assembly according to the invention. The same applies to engine bonnets and vehicle front hatches.

The object is also achieved by a method of the type named at the beginning, wherein the epicyclic gearing comprises a drive-side epicyclic gearing stage and an output-side epicyclic gearing stage and the method comprises the following steps:
  a) installing all planet gears of the two epicyclic gearing stages in a single planet carrier and
  b) then inserting the planet carrier into a ring gear of a drive-side epicyclic gearing stage or into a ring gear of an output-side epicyclic gearing stage.

The drive-side epicyclic gearing stage corresponds to a motor-side epicyclic gearing stage and the output-side epicyclic gearing stage corresponds to a spindle-side epicyclic gearing stage. Among other things, because of the single planet carrier the installation is comparatively fast and simple in comparison with known epicyclic gearings.

After step b), the ring gear of the output-side epicyclic gearing stage or the ring gear of the drive-side epicyclic gearing stage is fitted onto the planet carrier inserted in the ring gear of the drive-side epicyclic gearing stage or in the ring gear of the output-side epicyclic gearing stage.

In a variant, an epicyclic gearing housing is provided and the epicyclic gearing housing is connected to the drive-side ring gear.

The epicyclic gearing housing can be welded to the drive-side ring gear, wherein in particular the epicyclic gearing housing or the ring gear is transparent to laser light and the epicyclic gearing housing is laser welded to the ring gear.

BRIEF DESCRIPTION OF THE DRAWINGS

The invention is explained below with reference to an embodiment example, which is shown in the attached drawings. There are shown in.

DETAILED DESCRIPTION OF THE INVENTION

Figure 1:
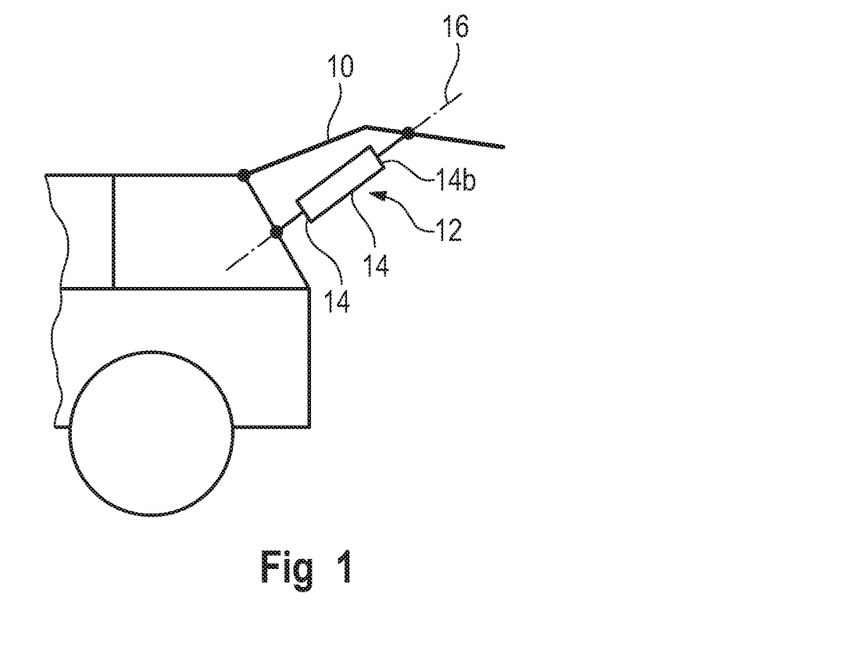
FIG. 1, schematically, a vehicle hatch according to the invention with a spindle drive assembly according to the invention, which is installed by means of a method according to the invention, FIG. 2 the spindle drive assembly from FIG. 1 in a schematic sectional view, FIG. 3 the spindle drive assembly from FIG. 1 in an exploded view, FIG. 4 the spindle drive assembly from FIG. 1 in a cut detail view, FIG. 5 a spindle drive motor of the spindle drive assembly from FIG. 1 in a perspective view, FIG. 6, schematically, the cooperation of the spindle drive motor from FIG. 5 with a spindle drive assembly housing in a partially cut view, FIG. 7, schematically, an end-side view of the spindle drive motor from FIGS. 5 and 6 as well as a housing cap that can be connected to the spindle drive motor, FIG. 8 an exploded view of a two-stage epicyclic gearing of the spindle drive assembly from FIG. 1, which can be installed by means of a method according to the invention, FIG. 9 a further exploded view of the two-stage epicyclic gearing of the spindle drive assembly from FIG. 1, wherein the epicyclic gearing is partially installed by means of a method according to the invention, FIG. 10 an exploded view of the spindle drive assembly from FIG. 1 comprising a two-stage epicyclic gearing, a coupling, a hysteresis brake and a spindle drive motor, FIG. 11 a spindle unit of the spindle drive assembly from FIG. 1 in an exploded view, FIG. 12 a detail of the spindle unit from FIG. 11, FIG. 13 a detail of the spindle drive assembly from FIG. 1 in a sectional view, and FIG. 14 a further detail of the spindle drive assembly from FIG. 1 in a sectional view.

FIG. 1 shows a vehicle hatch 10, which is a vehicle tailgate in the present case, with a spindle drive assembly 12, by means of which the vehicle hatch 10 can be opened and/or closed.

The spindle drive assembly 12 comprises a spindle drive assembly housing 14, which extends along a spindle drive axis 16.

Figure 2:
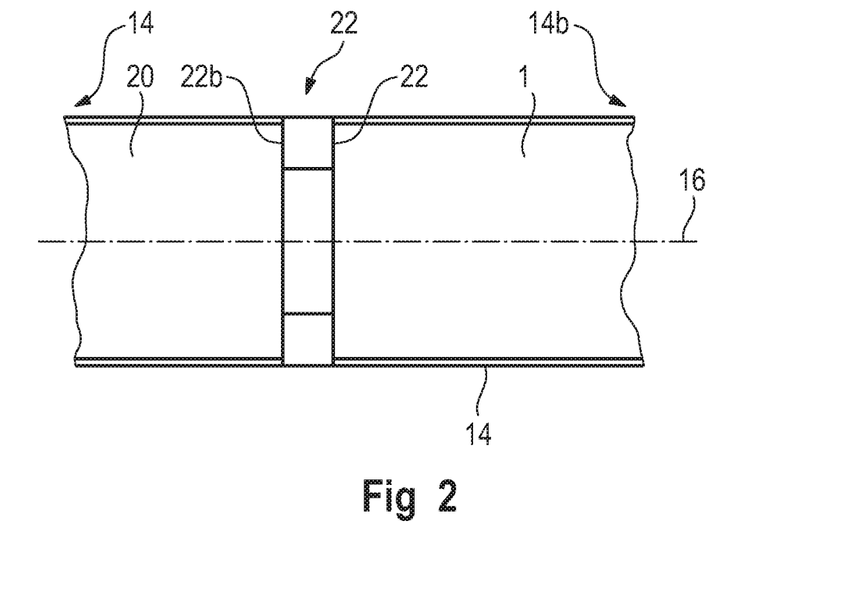

As can be seen in particular with reference to FIG. 2, a motor gearing unit 18 shown only schematically in FIG. 2 and a spindle unit 20 likewise shown only schematically in FIG. 2 are arranged in the spindle drive assembly housing 14.

Between its axial ends 14a, 14b the spindle drive assembly housing 14 comprises a stop section 22 acting axially on both sides.

The motor gearing unit 18 is arranged on a first axial side 22a of the stop section 22 and the spindle unit 20 is arranged on a second axial side 22b opposite the first axial side 22a.

Both the motor gearing unit 18 and the spindle unit 20 rest against the stop section 22.

In the shown embodiment (see in particular FIGS. 3 and 4), the motor gearing unit 18 is mounted in the spindle drive assembly housing 14 via two damping elements 24a, 24b, which are produced from an elastomer.

Figure 3:
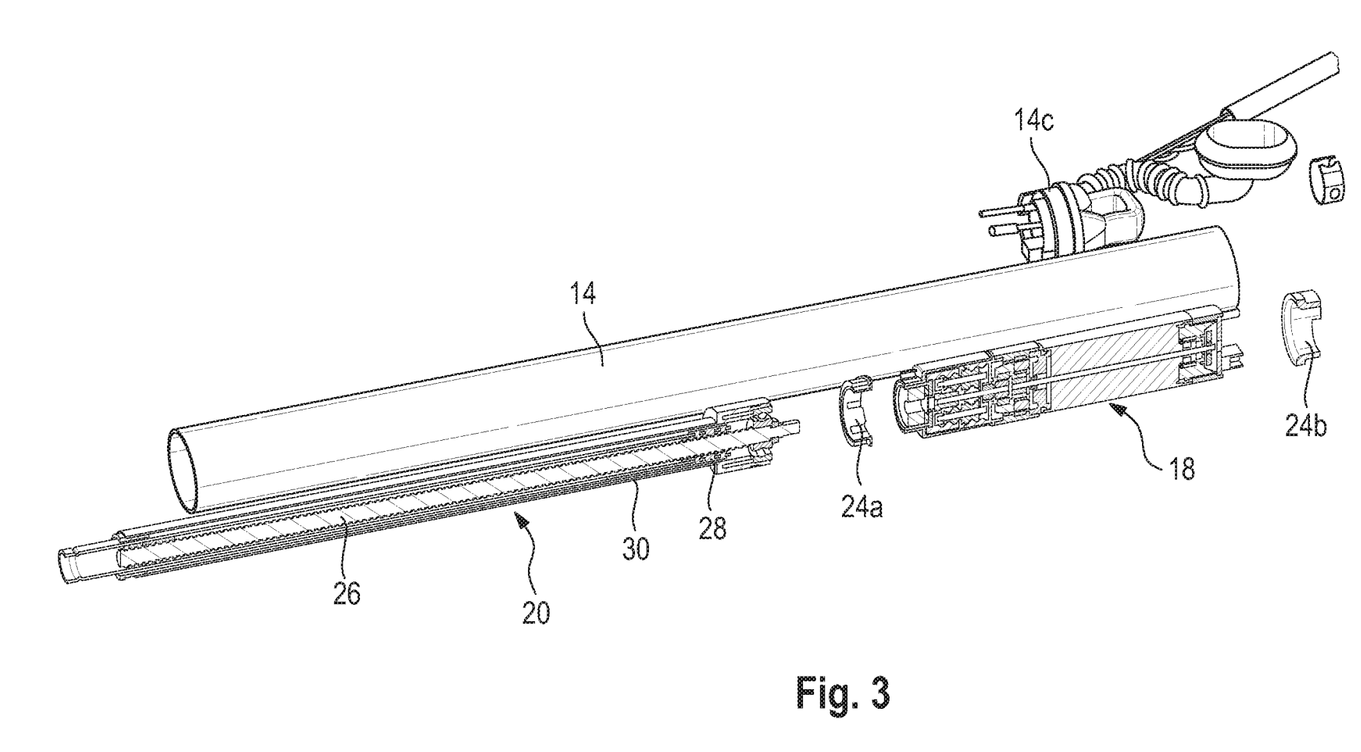
Figure 4:
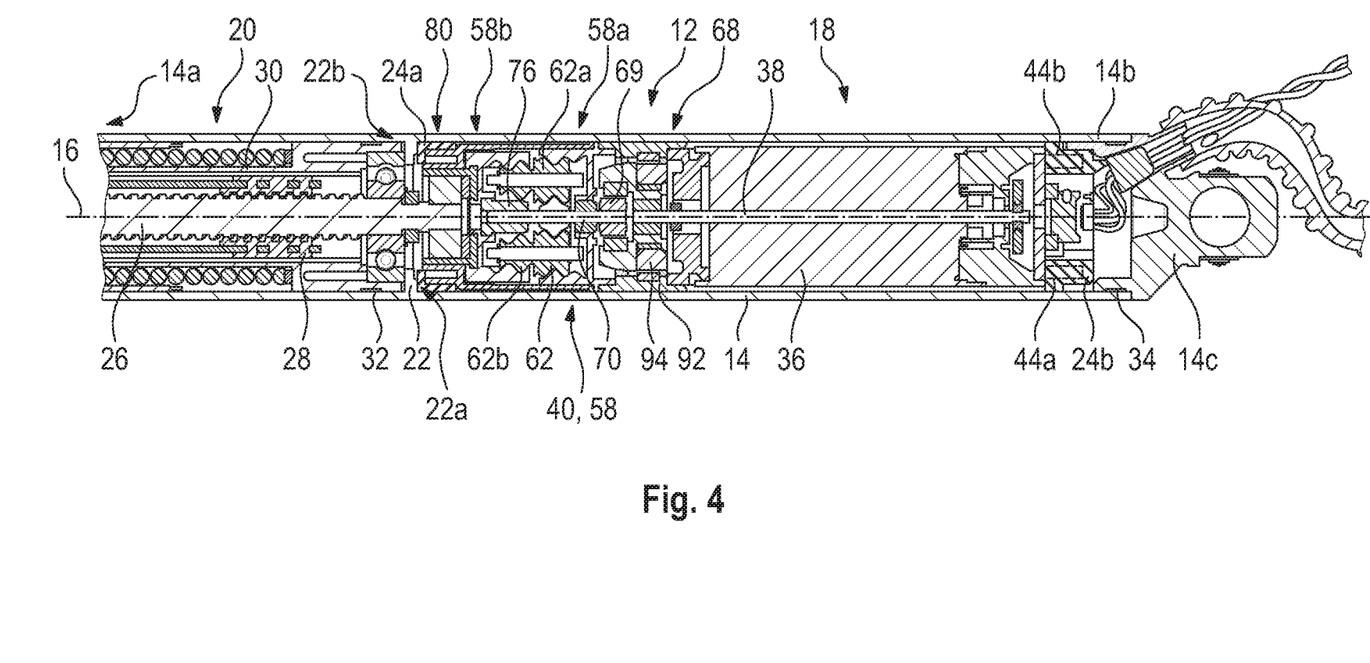

The spindle unit 20 comprises a guide tube 30 in addition to a spindle 26 and a spindle nut 28 coupled thereto.

In the shown embodiment, the guide tube 30 is secured to the spindle drive assembly housing 14. More precisely, the guide tube 30 is laser welded to the spindle drive assembly housing 14. The laser weld seam 32 is depicted only schematically.

The stop section 22 is produced in one piece with the spindle drive assembly housing 14.

The spindle drive assembly housing 14 is produced from a plastic.

In the present case, the stop section 22 is produced by means of injection moulding of the spindle drive assembly housing 14.

The spindle drive assembly housing 14 additionally comprises a housing cap 14c. This seals the spindle drive assembly housing 14 on the motor gearing unit side.

The housing cap 14c and the spindle drive assembly housing 14 are laser welded. The laser weld seam 34 is again depicted only schematically.

The installation of the spindle drive assembly 12 proceeds as follows.

First of all, the spindle drive assembly housing 14 is provided.

Then, the motor gearing unit 18 is inserted into the spindle drive assembly housing 14 starting from a first axial side of the spindle drive assembly housing 14, on which the axial end 14b is arranged in the example shown.

The motor gearing unit 18 is placed against the first axial side 22a of the stop section 22.

The spindle unit 20 is inserted into the spindle drive assembly housing 14 from a second axial side 22b thereof opposite the first axial side of the spindle drive assembly housing 14. In the shown embodiment, the axial end 14a is arranged on this side.

The spindle unit 20 is placed against the second axial side 22b of the stop section 22.

It is not relevant for the installation method whether it is the motor gearing unit 18 or the spindle unit 20 that is installed on the spindle drive assembly housing 14 first. The motor gearing unit 18 and the spindle unit 20 can also be installed substantially at the same time.

If the spindle unit 20 is inserted in the spindle drive assembly housing 14, it is secured therein. In the shown embodiment, the spindle unit 20 comprises a guide tube 30, which is secured to the spindle drive assembly housing 14 by means of the laser weld seam 32.

The spindle drive assembly housing 14 and the guide tube 30 are thus laser welded.

The spindle drive assembly housing 14 is subsequently sealed at the end 14b by means of a housing cap 14c. In this connection, the spindle drive assembly housing 14 is laser welded to the housing cap 14c.

The motor gearing unit 18 comprises a spindle drive motor 36 which is coupled to a gearing 40 via a motor shaft 38.

Figure 5:
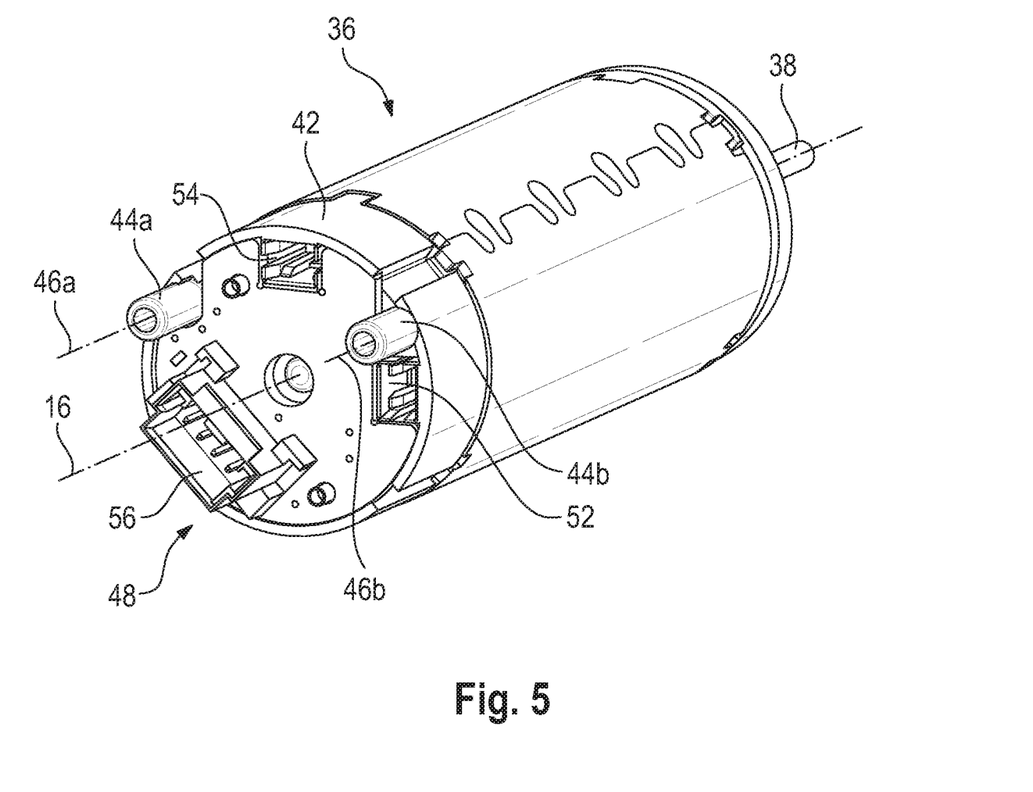
Figure 6:
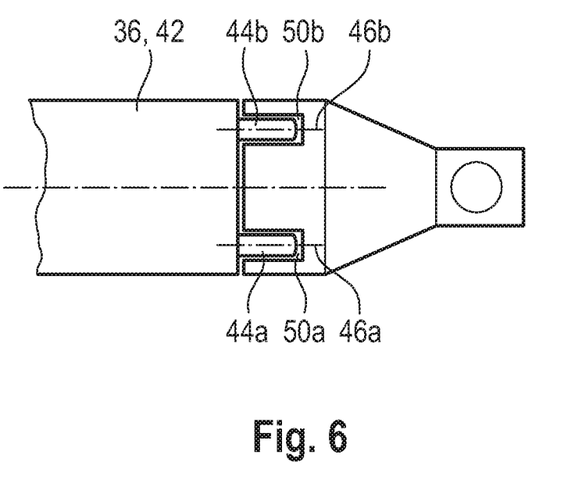
Figure 7:
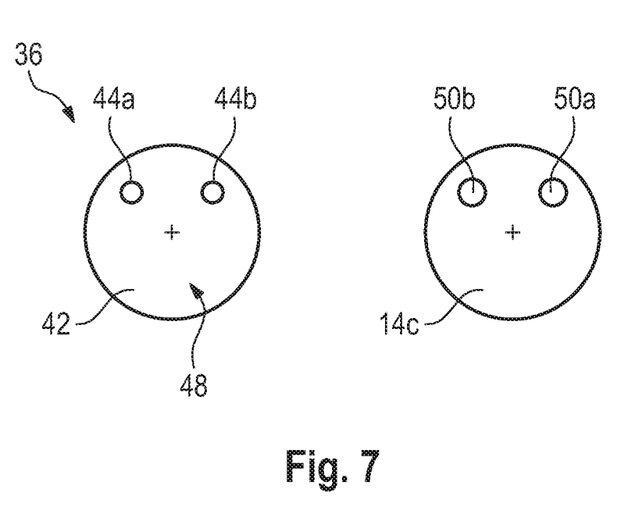

FIGS. 5-7 show the spindle drive motor 36 in detail.

After the motor gearing unit 18 has been arranged in the spindle drive assembly housing 14, the spindle drive motor 36 is also positioned in the spindle drive assembly housing 14. The motor shaft 38 is substantially coaxial with respect to the spindle drive axis 16.

The spindle drive motor 36 and thus the motor gearing unit 18 are in addition mounted in the spindle drive assembly housing 14 rotationally fixed with respect to the spindle drive axis 16 via a positive locking.

More precisely, the spindle drive motor 36 is mounted on the housing cap 14c, which is a constituent of the spindle drive assembly housing 14, rotationally fixed via a positive locking.

The rotationally fixed mounting is effected via a motor housing 42 of the spindle drive motor 36.

On the latter, in the shown embodiment, two anti-rotation protrusions 44a, 44b are provided, which extend substantially along the spindle drive axis 16 in the installed state of the spindle drive motor 36 and thus also of the motor gearing unit 18.

In the present case, the anti-rotation protrusions 44a, 44b are circular-cylindrical, wherein the assigned centre axes 46a, 46b of the circular cylinders run substantially parallel to the spindle drive axis 16 in the installed state of the spindle drive motor 36.

The anti-rotation protrusions 44a, 44b are provided on an axial end side 48 of the spindle drive motor 36, which faces away from the motor shaft 38. In the installed state, the anti-rotation protrusions 44a, 44b therefore lie on a side of the spindle drive motor 36 opposite the gearing 40.

In the installed state, the anti-rotation protrusions 44a, 44b engage in assigned recesses 50a, 50b provided on the spindle drive assembly housing 14. In the shown embodiment, the recesses 50a, 50b are provided on the housing cap 14c.

More precisely, in the shown embodiment, the recesses 50a, 50b are provided on the damping element 24b, which is connected to the housing cap 14c in a rotationally fixed manner.

The anti-rotation protrusions 44a, 44b can alternatively engage in the recesses 50a, 50b via elastic damping caps arranged on the anti-rotation protrusions 44a, 44b or via elastic damping elements arranged in the recesses 50a, 50b.

As can be seen in particular with reference to FIG. 5, in the shown embodiment, in addition to the anti-rotation protrusions 44a, 44b a first electrical power connection 52, a second electrical power connection 54 and a sensor connection 56 are additionally provided on the axial end side 48 of the spindle drive motor 36.

Figure 8:
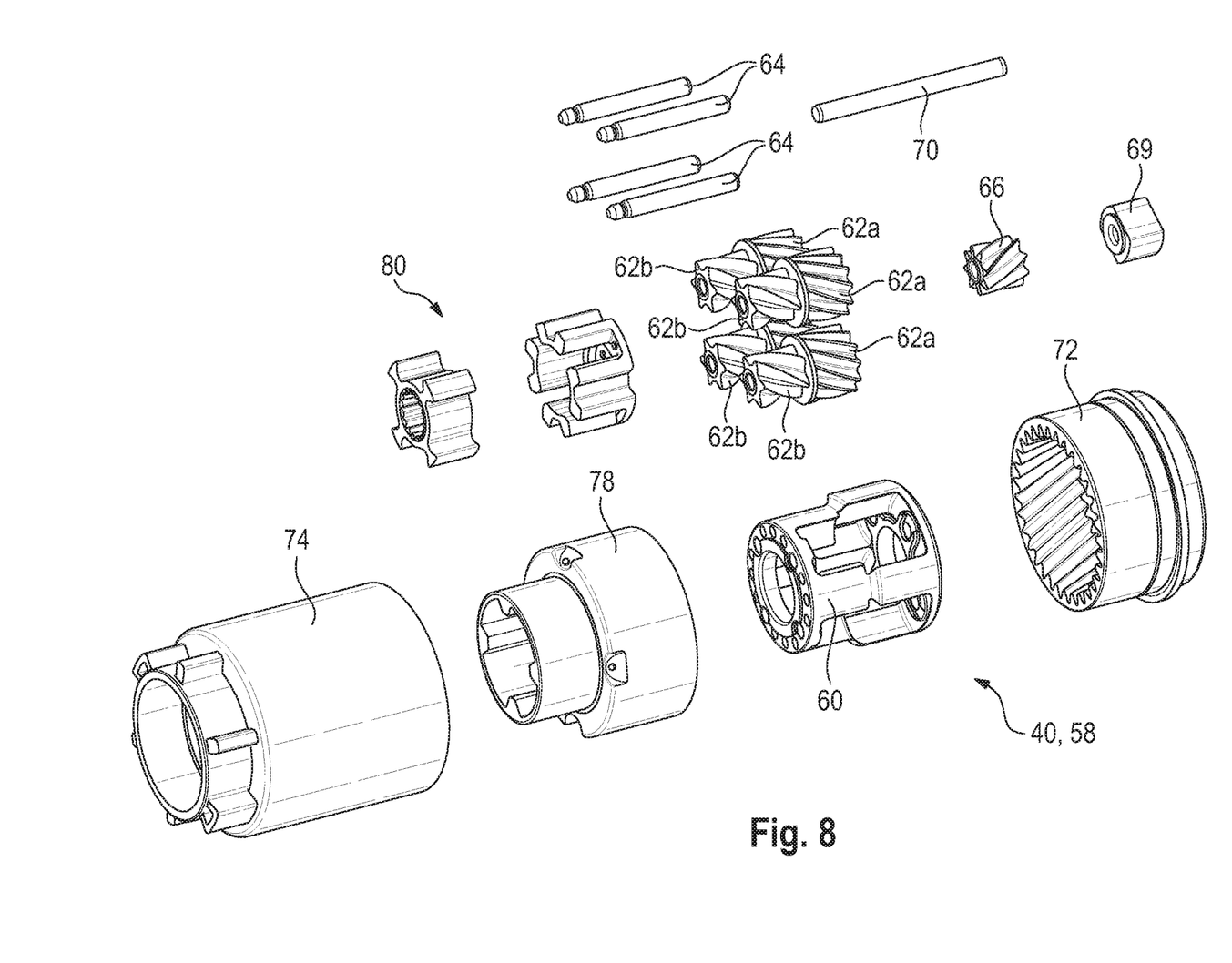
Figure 9:
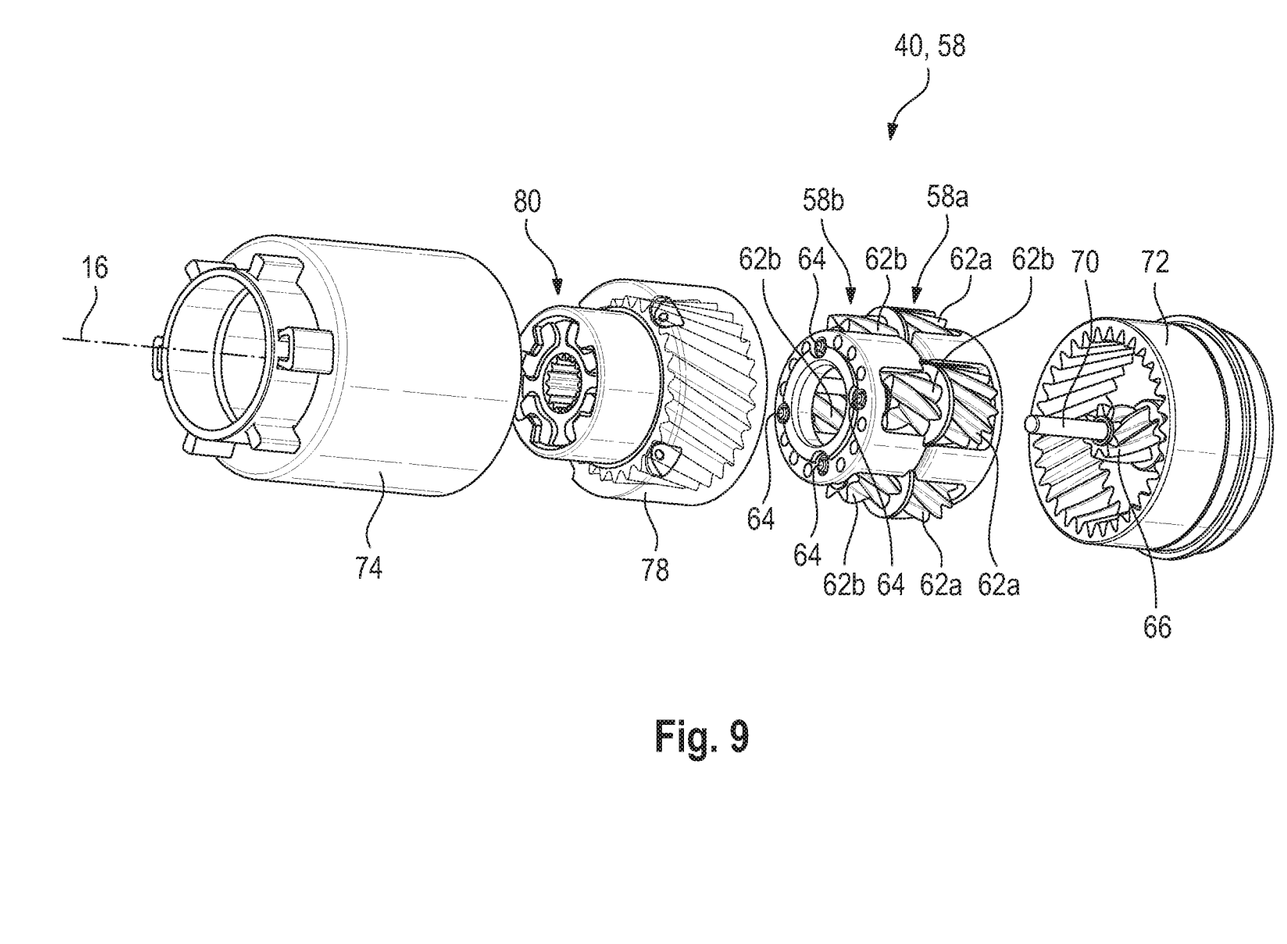

The gearing 40 can be seen in detail in FIGS. 8 and 9.

It can be seen there that the gearing 40 is a two-stage epicyclic gearing 58.

In this connection, it comprises a first epicyclic gearing stage 58a, which is also called motor-side or drive-side epicyclic gearing stage 58a, and a second epicyclic gearing stage 58b, which is also called spindle-side or output-side epicyclic gearing stage 58b.

The epicyclic gearing 58 is spiral-toothed. Both epicyclic gearing stages 58a, 58b have spiral tooth systems in the same direction.

In addition, the two-stage epicyclic gearing 58 comprises only one single planet carrier 60. The latter therefore belongs to both epicyclic gearing stages 58a, 58b.

Moreover, both the motor-side epicyclic gearing stage 58a and the spindle-side epicyclic gearing stage 58b comprise the same number of planet gears 62a, 62b. In the shown embodiment, each of the epicyclic gearing stages 58a, 58b comprises four planet gears 62a, 62b.

In each case one planet gear 62a of the first epicyclic gearing stage 58a and one planet gear 62b of the second epicyclic gearing stage 58b are mounted on a common planet gear axle 64.

The planet gears 62a, 62b mounted on a common planet gear axle 64 are connected to each other in a rotationally fixed manner.

The epicyclic gearing 58 functions as follows.

The motor shaft 38 is rotationally coupled to a sun gear 66 of the motor-side epicyclic gearing stage 58a. The sun gear 66 thus represents the drive or the torque input of the epicyclic gearing 58.

After this coupling has been effected via a coupling 68, strictly speaking a gearing input shaft 70 is coupled to the sun gear 66. However, it can be regarded as a continuation of the motor shaft 38.

The coupling 68 is an Oldham coupling for compensating for axial offset in the shown embodiment. Only a gearing-side coupling part 69, which is connected to the gearing input shaft 70, can be seen in FIG. 8.

The sun gear 66 cooperates with the planet gears 62a of the motor-side epicyclic gearing stage 58a, which are in turn coupled to a ring gear 72 of the motor-side epicyclic gearing stage 58a.

The ring gear 72 is mounted in the spindle drive assembly housing 14 and/or in an epicyclic gearing housing 74 in a rotationally fixed and axially fixed manner. The ring gear 72 is therefore substantially fixed in space.

The motor-side epicyclic gearing stage 58a is coupled to the spindle-side epicyclic gearing stage 58b both via the single planet carrier 60 and via the one-piece planet gears 62a, 62b.

The spindle-side epicyclic gearing stage 58b is designed without a sun gear.

The planet gears 62b of the spindle-side epicyclic gearing stage 58b are only mounted radially on an axial mounting extension 76 of the sun gear shaft of the motor-side epicyclic gearing stage 58a. The sun gear shaft corresponds to the gearing input shaft 70.

The planet gears 62b of the spindle-side epicyclic gearing stage 58b are furthermore coupled to a ring gear 78 of the spindle-side epicyclic gearing stage 58b.

This ring gear 78 is rotationally coupled to the spindle 26 via a coupling 80. The ring gear 78 is rotatably mounted in the spindle drive assembly housing 14 and/or in the epicyclic gearing housing 74.

The ring gear 78 therefore represents the output or the torque output of the epicyclic gearing 58.

The epicyclic gearing 58 can be installed as follows.

First of all, all planet gears 62a, 62b of the two epicyclic gearing stages 58a, 58b are installed in the single planet carrier 60.

Then, the planet carrier 60 is inserted into the ring gear 72 of the drive-side epicyclic gearing stage 58a or into the ring gear 78 of the output-side epicyclic gearing stage 58b.

The respectively other ring gear, i.e. the ring gear 78 or the ring gear 72, is thereafter fitted onto this combination.

The epicyclic gearing housing 74 is then provided and connected to the ring gear 72.

In the shown embodiment, the epicyclic gearing housing 74 is laser welded to the ring gear 72 in a lap joint. For this purpose, the epicyclic gearing housing 74 is transparent to laser light.

In order that during operation the spindle drive assembly 12 emits noises which are perceived as pleasant by a motor vehicle user, the ratio between the number of teeth of each of the planet gears 62a of the first epicyclic gearing stage 58a and the number of teeth of each of the planet gears 62b of the second epicyclic gearing stage 58b is chosen to be 2:1.

In the shown embodiment, each planet gear 62a of the first epicyclic gearing stage 58a comprises twelve teeth and each planet gear 62b of the second epicyclic gearing stage 58b comprises six teeth.

The ratio of 2:1 corresponds to an octave interval, if it is related to a ratio of sound frequencies.

After the sound frequency emitted by the first epicyclic gearing stage 58a has been decisively determined by the number of teeth of the planet gears 62a of the first epicyclic gearing stage 58a and the sound frequency emitted by the second epicyclic gearing stage 58b has been decisively determined by the number of teeth of the planet gears 62b of the second epicyclic gearing stage 58b, during operation the spindle drive assembly 12 therefore emits sound frequencies which form an octave. This is perceived as particularly pleasant by vehicle users.

In addition, a vehicle user associates a high level of quality of the spindle drive assembly 12 with such pleasant noises.

Alternatively, the ratio between the number of teeth of each of the planet gears 62a of the first epicyclic gearing stage and the number of teeth of each of the planet gears 62b of the second epicyclic gearing stage can also be chosen to be 3:2, 4:3, 5:4 or 6:5.

The emitted sound frequencies then form a fifth, a fourth, a major third or a minor third. These intervals are also perceived as pleasant by humans.

Generally speaking, the ratio between the number of teeth of each planet gear 62a of the first epicyclic gearing stage 58a and the number of teeth of each planet gear 62b of the second epicyclic gearing stage 58b is chosen in such a way that during operation a first sound frequency which is emitted by the first epicyclic gearing stage 58a deviates compared with a second sound frequency which is emitted by the second epicyclic gearing stage 58b by an integer multiple of a semi-tone.

The preferred embodiment of the octave comprises twelve semi-tone steps, that of the fifth comprises seven, that of the fourth comprises five, that of the major third comprises four and that of the minor third comprises three.

Figure 10:
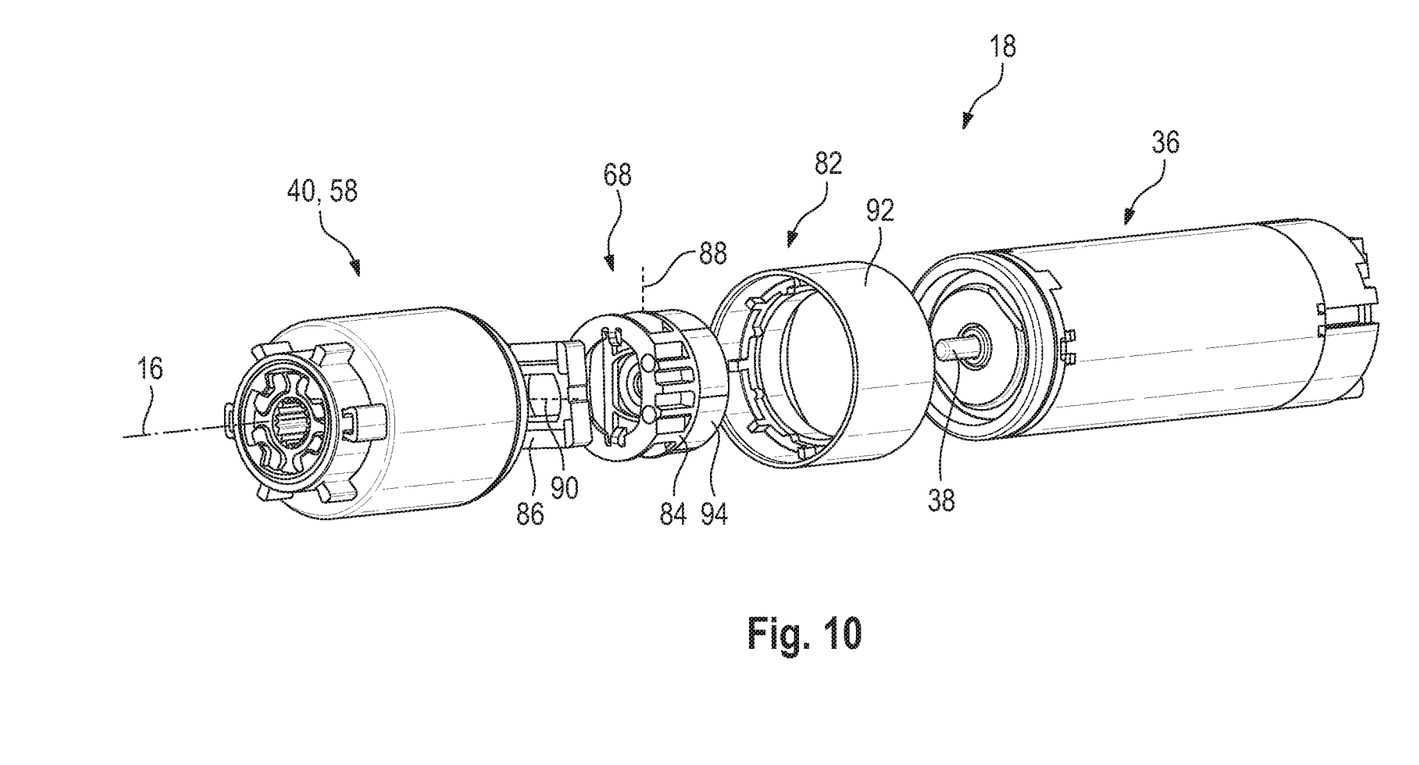

The coupling of the spindle drive motor 36 to the gearing 40, more precisely to the two-stage epicyclic gearing 58, is shown in detail in FIG. 10. The coupling 68 compensating for an axial offset and a hysteresis brake 82 are interposed in terms of drive between the spindle drive motor 36 and the gearing 40.

As already mentioned, the coupling 68 is an Oldham coupling and comprises a coupling part 84 on the drive motor side and the coupling part 69 on the gearing side (see FIG. 8).

The two coupling parts 69, 84 are connected to each other via a coupling intermediate part 86 in such a way that the motor shaft 38 and the gearing input shaft 70 are connected to each other in a rotationally fixed manner.

At the same time, the coupling intermediate part 86 is displaceable along a direction 88 with respect to the coupling part 84 on the drive motor side in the installed state.

The coupling part 69 on the gearing side is displaceable with respect to the coupling intermediate part 86 along a direction 90.

The direction 88 and the direction 90 are substantially at right angles to each other. An axial offset between the motor shaft 38 and the gearing input shaft 70 can thus be compensated for according to the functional principle of the Oldham coupling.

The hysteresis brake 82 comprises a stationary hysteresis brake component 92, which is secured to the spindle drive assembly housing 14 and/or to the epicyclic gearing housing 74.

In addition, the hysteresis brake 82 has a rotatable hysteresis brake component 94 rotationally coupled to the motor shaft 38.

This is secured to the coupling part 84 on the drive motor side, or integrated therein. In particular, the rotatable hysteresis brake component 94 is injected into the coupling part 84 on the drive motor side.

If the spindle drive assembly 12 is viewed perpendicular to the spindle drive axis 16, the coupling 68 is arranged substantially completely inside the hysteresis brake 82, in particular inside the stationary hysteresis brake component 92, in the axial direction. The structure of the coupling 68 and of the hysteresis brake 82 is therefore particularly compact.

FIGS. 11-14 show the spindle unit 20 in detail.

A stop assembly 96, which is formed to limit a movability of the spindle nut 28 along the spindle drive axis 16, is arranged at an axial end of the spindle 26. Specifically, the spindle nut 28 is thus prevented from moving beyond the end of the spindle 26.

The stop assembly 96 comprises a plastically deformable energy absorption component 97 which is designed in the shown embodiment as an energy absorption sleeve 98 which surrounds the spindle 26 substantially coaxially.

The energy absorption sleeve 98 is therefore mounted on the spindle 26.

Figure 14:
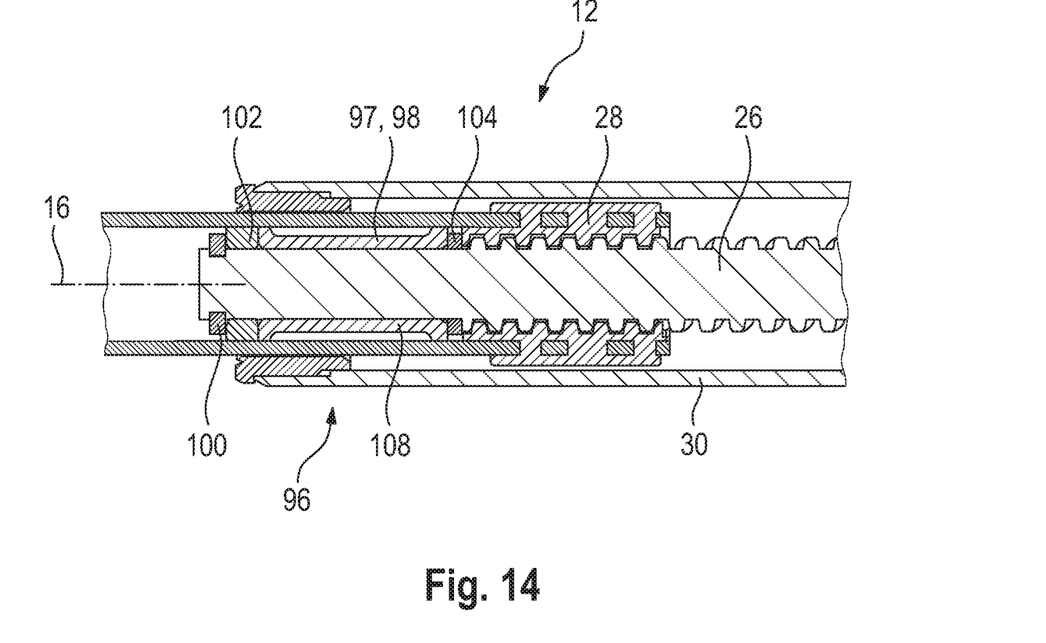

The energy absorption sleeve 98 is arranged along the spindle drive axis 16 between a bearing washer 100 on the spindle end side and the spindle nut 28 (see in particular FIG. 14).

Moreover, a mounting element 102 for mounting the spindle 26 on the spindle drive assembly housing 14 is provided between the energy absorption sleeve 98 and the bearing washer 100.

A thrust washer 104 displaceable axially on the spindle 26 is moreover arranged between the energy absorption sleeve 98 and the spindle nut 28.

Both the bearing washer 100 and the thrust washer 104 are produced from a metal material in the shown embodiment.

Figure 11:
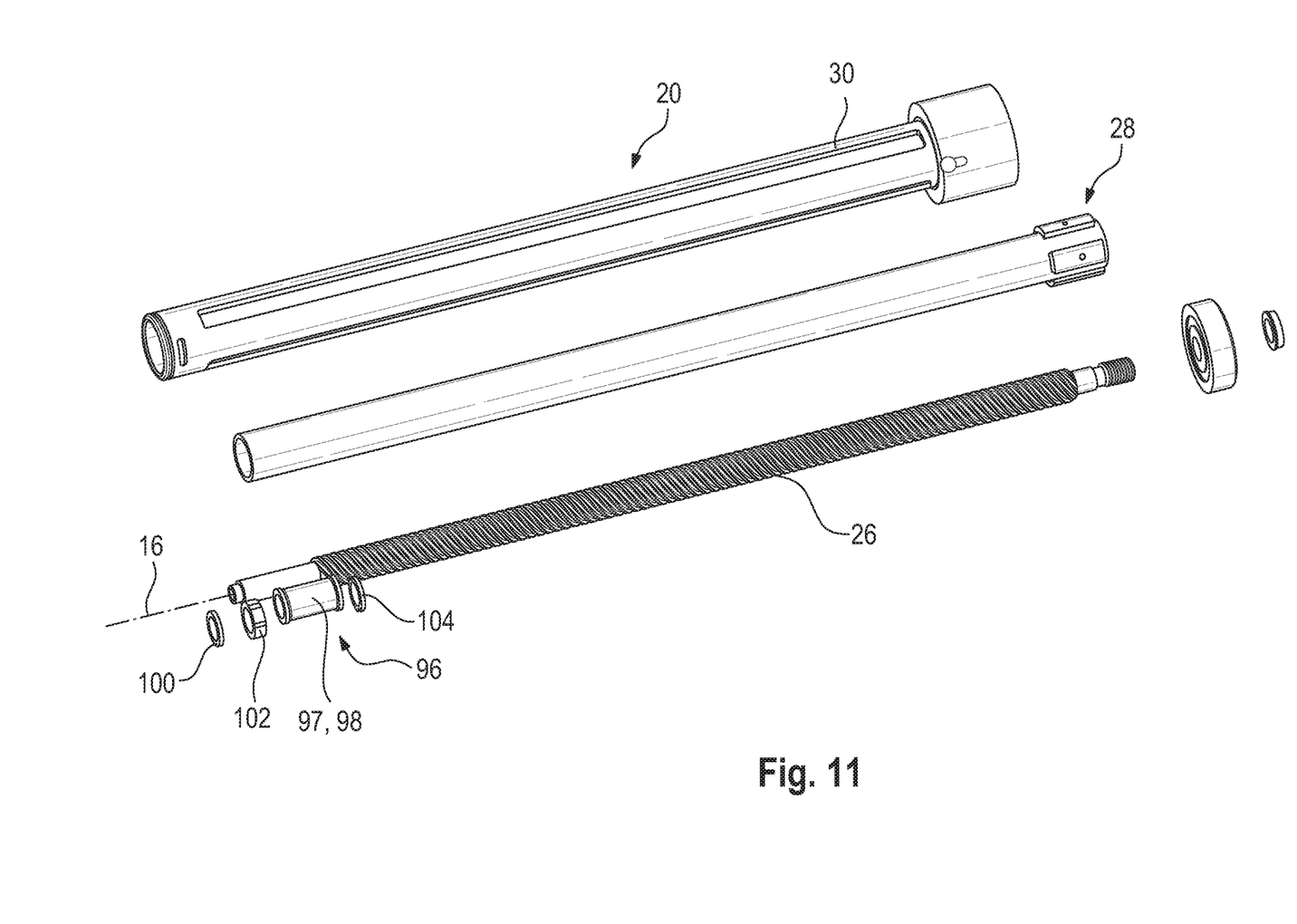
Figure 12:
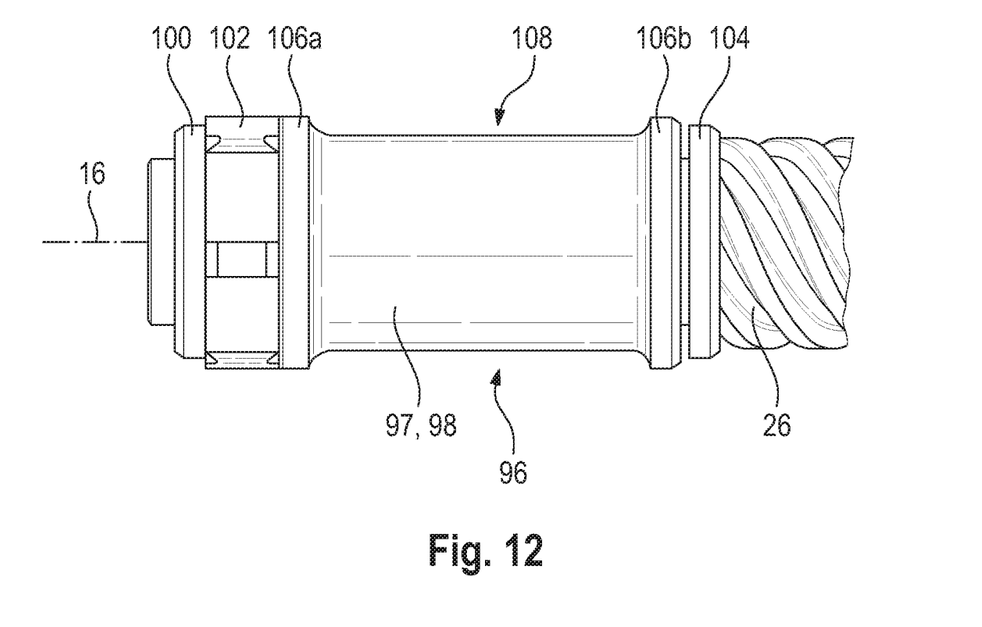

At both of its axial ends the energy absorption sleeve 98 in each case has a collar 106a, 106b formed as a force-transmission collar.

A deformation section 108 compressible in the direction of the spindle drive axis 16 lies between the collars 106a, 106b.

In the shown embodiment, the deformation section has only a single deformation region. In alternative embodiments, however, it can comprise several, in particular two deformation regions, wherein both deformation regions are compressible in the direction of the spindle drive axis 16.

Figure 13:
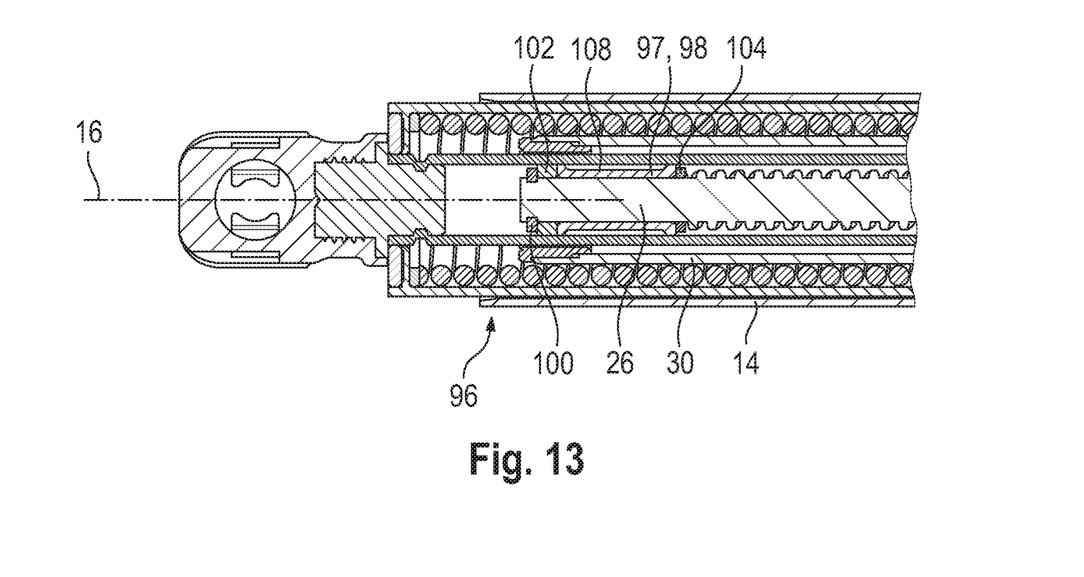

During a regular operation of the spindle drive assembly 12 the energy absorption sleeve 98 is substantially plastically undeformed (see in particular FIGS. 12 to 14). During regular operation loads on the energy absorption sleeve 98 preferably occur, which comprise exclusively forces of less than 750 N.

A load on the energy absorption sleeve 98 with a force of substantially over 3000 N represents an overload event for the shown embodiment. The energy absorption sleeve 98 is thereby plastically deformed.

Such an overload event occurs when the spindle nut 28 collides with the stop assembly 96, more precisely the energy absorption sleeve 98, at too high a speed and/or with too great a force.

This can happen for example in the case of a defect of the hysteresis brake 82.

An overload event can also occur during the installation of the vehicle hatch 10 when, although the spindle drive assembly 12 is already connected to the vehicle hatch 10, further components of the vehicle hatch 10 are still missing. The vehicle hatch 10 is then much lighter than during operation of an associated vehicle for which the spindle drive assembly 12 is designed. In this connection, the spindle drive assembly 12 can be transferred into an opening position by means of a spring, not described in more detail. Because of the relatively low weight of the vehicle hatch, the spindle nut 28 then runs up against the stop assembly 96 too quickly.

During all overload events the energy absorption sleeve 98 absorbs the energy resulting from the excessive speed and/or the excessive force and thus protects the remaining components of the spindle drive assembly 12 against damage.

In FIG. 14 the spindle nut 28 is shown to rest against the energy absorption sleeve 98. However, it is shown in its plastically undeformed state for the sake of better clarity.

A subsequent operation of the spindle drive assembly 12, in which the opening and closing of the vehicle hatch 10 continues to be possible without problems, is also called an overload-following operation. In this operating state the energy absorption sleeve 98 is plastically deformed (not shown).

For the case where the energy absorption sleeve 98 comprises several deformation regions, only one of the deformation regions is plastically deformed during the overload-following operation.

If a second overload event subsequently occurs and if the energy absorption sleeve 98 comprises a second deformation region, this deforms plastically because of the second overload event. Then, the spindle drive assembly 12 enters a secondary overload-following operation, in which the opening and closing of the vehicle hatch 10 by means of the spindle drive assembly 12 continues to be guaranteed.

The invention claimed is:

1. A spindle drive assembly for opening and/or closing a vehicle hatch, with a spindle extending along a spindle drive axis and a spindle drive motor coupled to the spindle in terms of drive, a motor shaft which is arranged substantially coaxially with respect to the spindle drive axis, wherein the spindle drive motor is coupled to the spindle via a two-stage epicyclic gearing, wherein the two-stage epicyclic gearing comprises a single planet carrier.

2. The spindle drive assembly according to claim 1, wherein a first epicyclic gearing stage and a second epicyclic gearing stage comprise a same number of planet gears, wherein in each case one planet gear of the first epicyclic gearing stage and one planet gear of the second epicyclic gearing stage are mounted on a common planet gear axle.

3. The spindle drive assembly according to claim 2, wherein planet gears mounted on the common planet gear axle are connected to each other in a rotationally fixed manner.

4. The spindle drive assembly according to claim 1, wherein the epicyclic gearing is spiral-toothed, wherein both of the epicyclic gearing stages are spiral-toothed in a same direction.

5. The spindle drive assembly according to claim 1, wherein the motor shaft is rotationally coupled to a sun gear of a motor-side epicyclic gearing stage.

6. The spindle drive assembly according to claim 1, wherein a ring gear of a motor-side epicyclic gearing stage is mounted in a spindle drive assembly housing and/or in an epicyclic gearing housing in a rotationally fixed and axially fixed manner.

7. A vehicle hatch, in particular a vehicle tailgate or a vehicle boot lid, with the spindle drive assembly according to claim 1.

8. A spindle drive assembly for opening and/or closing a vehicle hatch, with a spindle extending along a spindle drive axis and a spindle drive motor coupled to the spindle in terms of drive, a motor shaft which is arranged substantially coaxially with respect to the spindle drive axis, wherein the spindle drive motor is coupled to the spindle via a two-stage epicyclic gearing, wherein a spindle-side epicyclic gearing stage is designed without a sun gear, wherein all planet gears of the spindle-side epicyclic gearing stage are mounted radially on an axial mounting extension of a sun gear shaft of the motor-side epicyclic gearing stage.

9. The spindle drive assembly according to claim 8, wherein a ring gear of the spindle-side epicyclic gearing stage is rotationally coupled to the spindle.

10. The spindle drive assembly according to claim 8, wherein a ring gear of the spindle-side epicyclic gearing stage is rotatably mounted in a spindle drive assembly housing and/or in an epicyclic gearing housing.

11. A method for installing an epicyclic gearing of a spindle drive assembly for opening and/or closing a vehicle hatch, wherein the epicyclic gearing comprises a drive-side epicyclic gearing stage and an output-side epicyclic gearing stage, with the following steps:
   a) installing all planet gears of the two epicyclic gearing stages in a single planet carrier and
   b) then inserting the planet carrier into a ring gear of the drive-side epicyclic gearing stage or into a ring gear of the output-side epicyclic gearing stage.

12. The method according to claim 11, wherein after step b), the ring gear of the output-side epicyclic gearing stage or the ring gear of the drive-side epicyclic gearing stage is fitted onto the planet carrier inserted in the ring gear of the drive-side epicyclic gearing stage or in the ring gear of the output-side epicyclic gearing stage.

13. The method according to claim 11, wherein an epicyclic gearing housing is provided and the epicyclic gearing housing is connected to the drive-side ring gear.

14. The method according to claim 13, wherein the epicyclic gearing housing is welded to the drive-side ring gear, wherein the epicyclic gearing housing or the ring gear is transparent to laser light and the epicyclic gearing housing is laser welded to the ring gear.

* * * * *